US008198773B2

(12) United States Patent
Wishart (10) Patent No.: US 8,198,773 B2
(45) Date of Patent: Jun. 12, 2012

(54) INCREASED EFFICIENCY COUNTER-ROTATING ELECTRIC MOTOR FOR PROPELLING A BOAT

(75) Inventor: Randell J. Wishart, Reno, NV (US)

(73) Assignee: E-Wish Technology, LLC, Reno, NV (US)

( * ) Notice: Subject to any disclaimer, the term of this patent is extended or adjusted under 35 U.S.C. 154(b) by 352 days.

(21) Appl. No.: 12/584,557

(22) Filed: Sep. 8, 2009

(65) Prior Publication Data

US 2010/0003871 A1  Jan. 7, 2010

Related U.S. Application Data

(63) Continuation-in-part of application No. 12/387,413, filed on May 1, 2009.

(60) Provisional application No. 61/126,320, filed on May 2, 2008, provisional application No. 61/137,681, filed on Aug. 1, 2008.

(51) Int. Cl.
*H02K 23/60* (2006.01)
*H02K 23/66* (2006.01)
*B60L 11/00* (2006.01)

(52) U.S. Cl. ............... 310/115; 440/6; 310/87; 310/246
(58) Field of Classification Search .............. 310/115, 310/242, 247, 246, 87; 440/6, 7
See application file for complete search history.

(56) References Cited

U.S. PATENT DOCUMENTS

| 1,351,999 | A | * | 9/1920 | Heath | 310/115 |
| 2,431,255 | A | | 11/1947 | Jenkins et al. | |
| 2,456,993 | A | | 12/1948 | Rambo et al. | |
| 2,462,182 | A | | 2/1949 | Guerdan et al. | |
| 3,112,610 | A | * | 12/1963 | Jerger | 60/221 |
| 3,599,168 | A | * | 8/1971 | Long | 439/476.1 |
| 3,925,696 | A | * | 12/1975 | Popov et al. | 310/242 |
| 4,056,746 | A | | 11/1977 | Burtis | |
| 4,259,604 | A | | 3/1981 | Aoki | |
| 5,078,628 | A | * | 1/1992 | Garis, Jr. | 440/6 |
| 5,089,734 | A | | 2/1992 | Bickraj | |
| 5,599,215 | A | * | 2/1997 | Jarvinen | 440/6 |
| 2006/0162963 | A1 | | 7/2006 | Hagemeyer et al. | |

FOREIGN PATENT DOCUMENTS

JP   61-139592 A  *  6/1986

* cited by examiner

*Primary Examiner* — Burton Mullins
(74) *Attorney, Agent, or Firm* — James M. Ritchey (57) ABSTRACT

An enhanced counter-rotating electric motor and an associate propulsion system for use with a water-vehicle includes a motor housing, a stator within the housing that rotates about a central axis in one direction, an armature within the stator that rotates about the central axis in an opposite direction from the stator, a first axle that is secured to the stator and extends out from the housing, a second axle that is secured to the armature and extends out from the housing, water-tight rotational seals about each of the two axles, a centrifugal-force-balancing electrical connection mechanism that supplies functioning electrical communication between the motor and external electrical circuitry while operating the motor, and a propeller secured to each said axle.

3 Claims, 7 Drawing Sheets

INCREASED EFFICIENCY COUNTER-ROTATING ELECTRIC MOTOR FOR PROPELLING A BOAT

This application is a continuation-in-part of copending application Ser. No. 12/387,413 filed on May 1, 2009 which claims priority from U.S. provisional applications Ser. No. 61/126,320 filed on May 2, 2008 and Ser. No. 61/137,681 filed on Aug. 1, 2008 U.S.

BACKGROUND OF THE INVENTION

1. Field of the Invention

The subject invention relates to an increased efficiency counter-rotating electric motor and to suitable marine-vehicle propulsion systems and uses for the subject motor which has an improved efficiency of operation over traditional motors. When utilized on a typical fishing boat, this type of marine-vehicle propulsion system is frequently termed a "trolling" motor. More specifically, the subject invention utilizes a counter-rotating electric motor in which both an armature/rotor and a stator/field magnets rotate in opposite directions during operation. Generally, the subject motor is suspended by support means, wherein an armature shaft or axle is attached to and extends from the armature of the motor and a stator shaft or axle is attached to and extends from the stator of the subject motor. Included is a properly configured centrifugal-force-balancing means that is mandated by the rotating stator. As indicated, both the armature and the stator rotate, in opposite directions, thereby minimizing the creation of heat during operation and accessing torsional forces normally lost by utilizing a traditional motor in which the stator is fixed within the motor housing.

2. Description of Related Art

For a traditional motor, the outside/surrounding motor housing is stationary, as is the stator/field magnets within the housing. The stator is usually affixed to the housing. An internal armature/rotor is attached to a shaft or axle that rotates during operation (in some versions of a standard motor the rotor may be termed the armature). Thus, the armature shaft/axle extends out from the stationary motor housing and rotates when electrical current is applied to the motor (the armature/rotor rotates within the stationary stator/field magnets). The history of traditional electric motors is extensive and one version is found at www.sparkmuseum.com/MOTORS.HTM.

A counter-rotating electric motor is described in related U.S. Pat. Nos. 2,431,255, 2,456,993, and 2,462,182. The disclosed motor was to be used in torpedo propulsion systems in which a coaxial propeller assembly drove separate propellers in opposite directions to aid in keeping the torpedo traveling in a desired direction. Clearly, the operational lifetime of such a motor is extremely limited, given its destruction upon hitting a target. To eliminate necessary centrifugal/centripetal influenced commutator-to-brush contact breaks created while the stator is rotating (normally the stator is not rotating so a constant resilient means or spring simply forces a brush inward and towards the center of rotation, thereby contacting the commutator for the required electrical communication, but rotation of the stator causes the brushes to "float" away from the commutator), the device contained a "radial commutator" (a disk extending outwardly from the axis of rotation) and contact brushes directed parallel to the axis of rotation. This radial commutator/brush design is complex, not easily fabricated, and, thus, expensive to manufacture.

U.S. Pat. No. 4,056,746 presents a counter rotation electric motor that is quite similar to the design present immediately above. Once again a radial commutator/brush design is utilized in the operation of the device.

A DC rotary machine is related in U.S. Pat. No. 4,259,604. The commutator/brush design in this device is very simplistic and is not created to operate at high rotational velocities. Typically, the motor is used in a machine such as a tape recorder, VTR, and the like that need low rotational speeds. The commutator is of standard cylindrical design and the brushes are contacted in a permanent fashion against the commutator bars.

A dual rotary AC generator is described in U.S. Pat. No. 5,089,734. This disclosure presents, basically, a motor run in reverse, thereby becoming a generator in which both the magnetic field and armature rotate in opposite directions. Unfortunately, the manner in which the device receives or delivers electricity is not related, nor are any internal electrical components described.

U.S. Patent Publication No.: 2006/0163963 discloses a counter rotating generator. Once again, a radially disposed set of disks are utilized in the commutator/brush design. In this case, the slip rings have a relatively large diameter (which is claimed to decrease heat production) and contact brushes in a continual manner, with constant force, regardless of rotational speed. Additionally, the described generator is used in relatively slow RPM situations in which the wind or manual cranking are utilized as the driving forces, unlike the subject invention that may be operated from relatively low to relatively high RPM values.

BRIEF SUMMARY OF THE INVENTION

An object of the present invention is to provide a counter-rotating electric motor for use on a water-vehicle (boat, ship, or equivalent vehicle) in which the armature rotates in a first direction and the stator rotates in an opposite second direction about a common central axis and then their opposite rotations are linked to appropriately configured propellers to move the vehicle through the surrounding water in a common direction.

A second object of the subject invention is to improve the efficiency of a counter-rotating electric motor by accessing torsional forces normally lost to stationary motor mounts that hold the stator in a fixed position.

Another objective of the subject invention is to improve the efficiency of a counter-rotating electric motor by accessing torsional forces normally lost to stationary motor mounts by allowing the motor stator and armature to rotate freely, wherein the armature and attached armature output means rotates in one direction and the stator and stator output means rotates in an opposite direction about a common central axis and necessary electrical contact is maintained via a centrifugal-force-balancing commutator-to-brush assembly.

Yet a further objective of the subject invention is to improve the efficiency of a counter-rotating electric motor for use in a water-vehicle by limiting creation of heat and accessing torsional forces normally lost to stationary motor mounts by rotationally securing at opposite ends output means and allowing the mated stator to armature assembly to rotate freely with an armature-connected-shaft rotating in one direction and a stator-connected-out means rotating in an opposite direction and then linking the two opposite rotations to propellers configured to drive the water-vehicle is one direction.

Still yet a further object of the subject invention is to disclose a trolling motor for a water-vehicle that includes two oppositely rotating propellers with one propeller linked to a stator and the other propeller linked to an armature, wherein necessary electrical contact is maintained via a centrifugal-force-balancing commutator-to-brush assembly comprising a counter-balance-to-brush system that maintains contact between each brush and the commutator during operation of the motor.

Disclosed is a novel configuration of a trolling motor for use with a water-vehicle. Comprising the subject invention is a power supply, a control means, water-vehicle mounting means, and a submersible electric motor having two main halves that are rotationally mated with one another: 1) the armature or rotor half and 2) the stator or field magnets half, both of which freely rotate in opposite directions during operations (unlike traditional motors in which the stator is stationary and normally attached to a motor housing). A first shaft is connected to and extends from the armature and a second shaft is connected to and extends from the stator, with both the first and second shafts fitted with appropriately configured propellers. Suitable rotational bearing assemblies are incorporated within a surrounding housing, thereby bracketing both halves between supporting first and second bearings with each half rotating in an opposite direction during operation of the subject motor. The mated stator-to-armature assembly is fitted within the housing and incorporates water-tight seals that surround each of the propeller-connected shafts. The subject motor contains a modified brush assembly (centrifugal-force-balanced assembly) in which each brush is biased to maintain constant electrical contact as both halves rotate (in traditional motors the brushes are connected to a stationary component of the motor and do not rotate and, usually, for a continuous electrical connection, the brushes are forced to touch the commutator by associated springs to deliver current in a motor, but when they rotate in the subject invention (again, remembering in a traditional motor the brushes do not rotate) the created centrifugal force (directed away from the center of rotation) needs to be overcome or balanced by a additional biasing means that is directed inwardly towards the center of rotation (one suitable means being counter-weights or the like that force the brushes to stay in contact with the commutator and oppose the centrifugal force) to maintain constant electrical contact.

The subject invention has numerous advantages over existing technologies, including, but not limited to:

1) Counter-rotating propellers are more efficient and require approximately 40% less power to produce the same thrust a standard motor with one propeller. A traditional motor with one propeller requires approximately 29 amps to operate while the subject counter-rotating motor requires only 19 amps for the same thrust, thus resulting in a longer/extended battery life for the propulsion system.

2) Since the counter-rotating requires less power to operate, smaller and fewer batteries are required to function.

3) The counter-rotating motor with two propellers results in greater thrust at half the RPM as a traditional motor.

4) Since a major problem for a boat operated in shallow water is that the propeller is easily entangled in weeds, but two propellers create a greater ability to tear through weed obstacles. Also, with two propellers, both spinning at slower than traditional speeds, the winding of weeds about a propeller is reduced.

5) There is an overall improvement is safety with the counter-rotating propulsion system since with two propellers if one is damaged the second propeller is still operable.

6) Since the counter-rotating system produces approximately 40% more power at half the standard propeller rotational speed, the lower propeller rotational speed creates less water turbulence and noise. Less turbulence and noise are favorable conditions for stalking fish.

7) With the slower RPM counter-rotating motor in use, less internal motor heat is created, thus allowing the battery energy to produce more efficient thrust for the subject motor and propulsion system.

8) With the electrical contacting slip rings mounted outside the mated stator and armature, but inside the water-tight motor housing the assembly of the motor is simplified during manufacturing and repairing procedures.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is presented in the embodiments generally shown in FIG. 1 through FIG. 8. It will be appreciated that the subject apparatus may vary as to configuration and as to details of the parts without departing from the basic concepts as disclosed herein.

Generally, the subject invention is a counter-rotating electric motor and water-vehicle propulsion system utilizing the counter-rotating electric motor. The counter-rotating motor includes within a water-tight or secure motor housing a stator having first and second ends that rotates about a central axis in a first direction, an armature having first and second ends that rotates about the central axis in a second direction, wherein the stator surrounds at least a portion of the armature. A first axle is secured to the stator and extends along the central axis, wherein said first axle rotates in the first direction and a second axle is secured to the armature and extends along the central axis, wherein the second axle rotates in said second direction. Provided is an electrical connection means that includes centrifugal-force-balancing electrical contact maintenance means for providing, functioning electrical contacts while operating said motor. Preferably, the centrifugal-force-balancing electrical connection means comprises at least one brush, a commutator upon which the brush rides for electrical contact during operation of the electric motor, and brush-associated counter-weights for overcoming the outward centrifugal force (without-correction, this outward force would "float" the brush, thereby breaking necessary electrical contact) on each brush, whereby each brush is directed inwardly toward the central axis for maintaining brush-to-commutator contact during operation of the electric motor.

Figure 1:
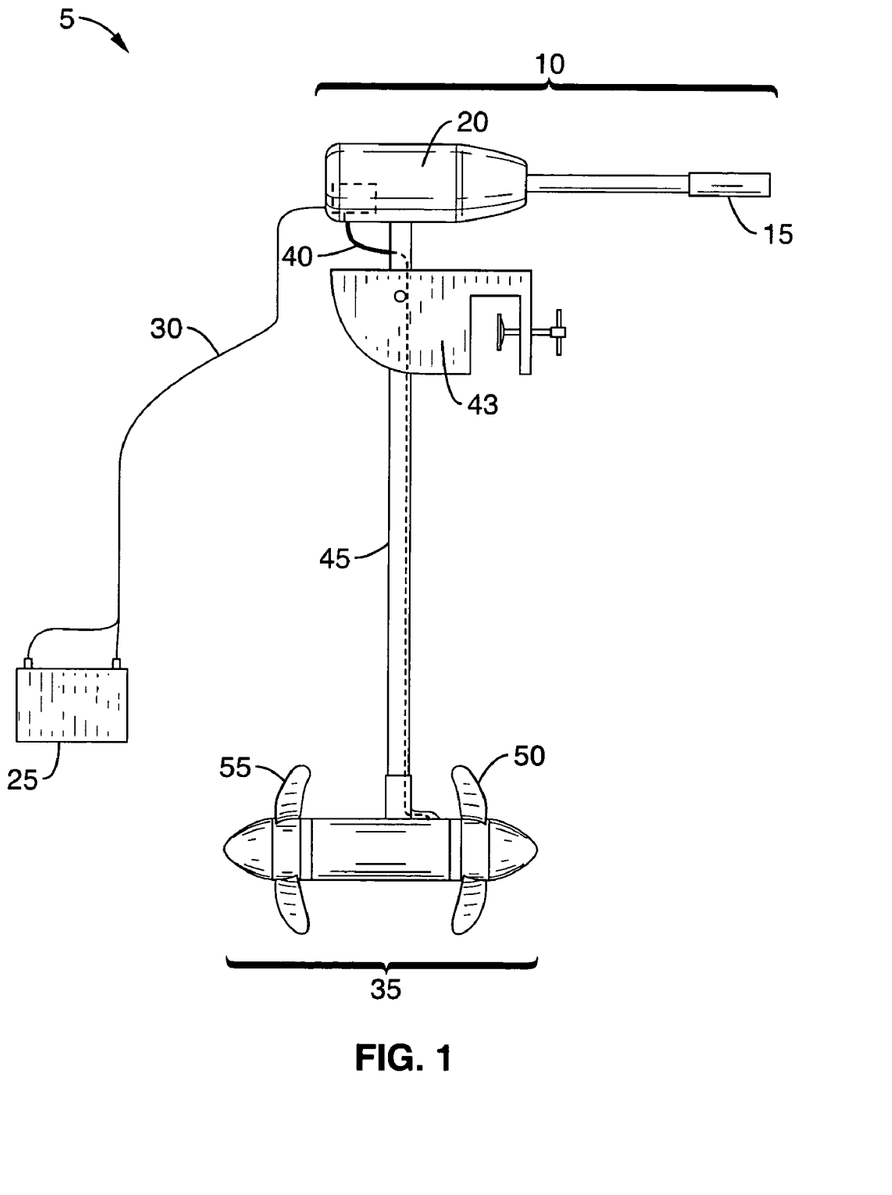
FIG. 1 is a side view of the subject water-vehicle propulsion system.

Specifically, the subject propulsion system 5 is depicted in FIG. 1. Comprising the subject invention is a control assembly 10 that a user employs for motor speed adjustments and propeller direction control. The exact fabrication of the control assembly may vary within recognized parameters known to those skilled in the relevant art. Normally, the control assembly 10 incorporates a user-handle 15 fashioned to contain, usually, a motor speed control means such as a rotatable grip, squeezable trigger, or equivalent means and electrical control module 20 that is in communication with the user-control handle 15, battery 25, via an electrical battery-cable 30, and a counter-rotating motor assembly 35, via a electrical motor-cable 40.

The electrical control module 20 is comprised of standard motor speed control means that recognizes and communicates a user-desired speed selection with the counter-rotating motor assembly 35. The control module receives power from the associated battery or batteries via the battery-cable 30 and utilizes that power to drive the counter-rotating motor assembly 35 via motor-cable 40.

The subject invention is secured to a selected water-vehicle with suitable mounting means. The subject device may be incorporated as an integral part of the water-vehicle's structure (e.g.: permanently secured to a structural element such as the hull, railing, or the like of the water-vehicle) or in a fashion that allows for easy removal. A preferred embodiment, shown in FIG. 1, is a releasable mounting clamp 43 that a user tightens to the water-vehicle in a suitable location. A support shaft 45 runs from the control assembly 10, through the mounting clamp, and to the counter-rotating motor assembly 35. The support shaft 45 is fabricated from suitably rigid material(s) such as metals, alloys, various acceptable polymeric substances, and the like. Thus, when the water-vehicle is in a body of water and the subject propulsion system secured to the water-vehicle, the control assembly 10 is within easy reach of the user and the water-tight counter-rotating motor assembly 35 is submerged into the surrounding water.

The direction in which the water-vehicle is motivated is frequently accomplished by the user moving the handle 15 to one side or the other, thereby rotating the direction in which the associated counter-rotating propellers 50 and 55 are aimed.

Figure 2:
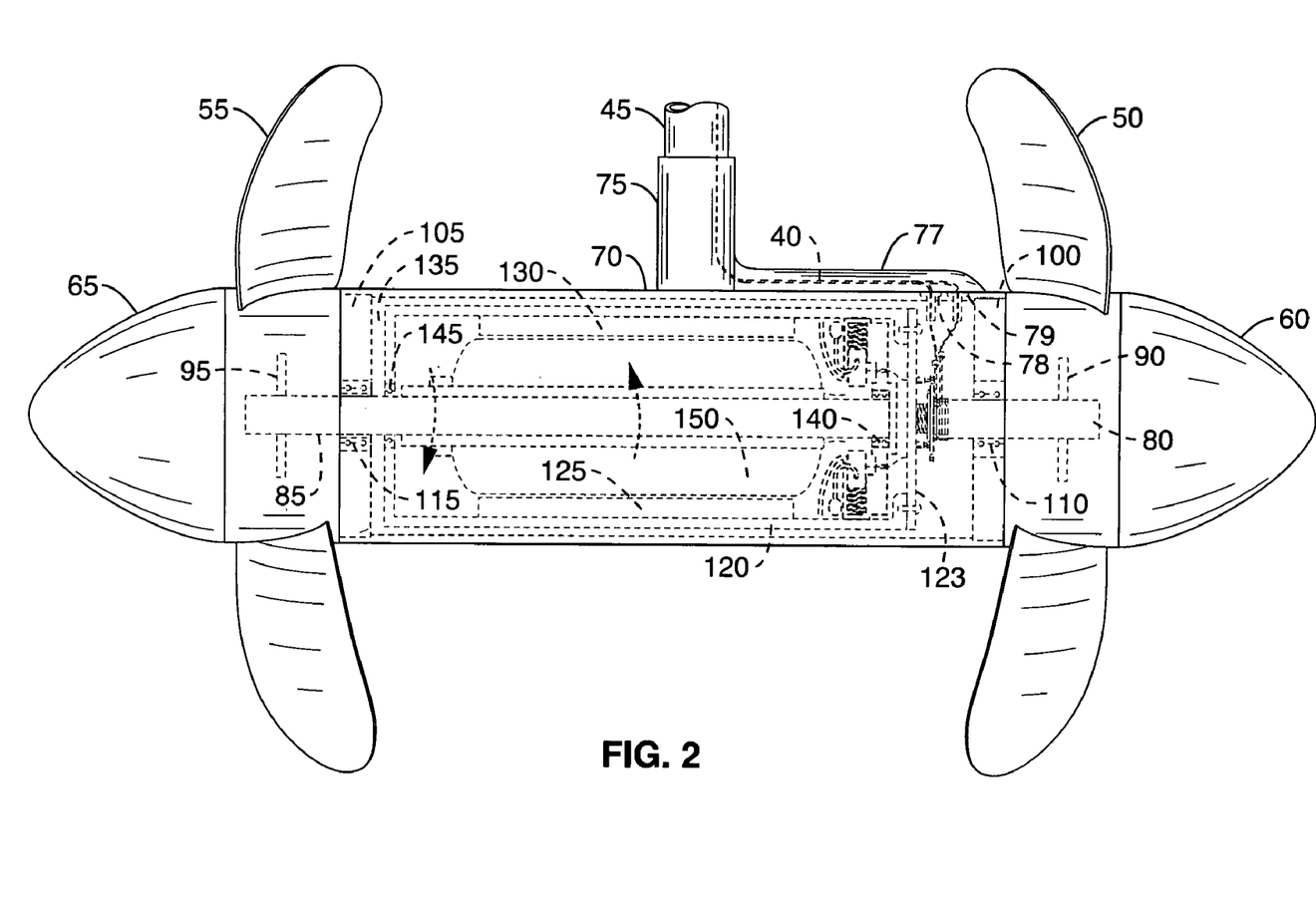
FIG. 2 is side view of the counter-rotating motor assembly portion of the subject water-vehicle propulsion system depicting internal components and showing the counter-rotating motor's location between two propellers that rotate in opposite directions during operation of the subject system and showing by arrows the opposite directions in which the stator and armature rotate to drive the attached propellers.

FIG. 2 depicts the end of the support shaft 45, electrical motor-cable 40, and the counter-rotating motor assembly 35. Comprising the motor assembly 35 are a first propeller 50 and a second propeller 55. Since during operation of the subject motor these two propellers 50 and 55 rotate in opposite directions, the propeller blades are fabricated with opposite angles so that when the propellers 50 and 55 are spinning in opposite directions during operation a unidirectional overall propulsion force is created. Usually, protective end caps 60 and 65 are fitted over the outer ends of the propellers 50 and 55, respectively. These caps 60 and 65 may add useful hydrodynamic properties to the propulsion system as the water-vehicle mover through the surrounding water. The actual shape of these caps 60 and 65 may vary and conical ones depicted are shown for exemplary purposes only and not by way of limitation.

As can be seen in FIG. 2, the counter-rotating motor assembly 35 comprises, in addition to the propellers 50 and 55 and end caps 60 and 65, varied internal components. A hollow motor housing 70 is secured by a coupling bracket 75 to the support shaft 45. A cable protector 77 is usually included that extends from the bracket 75 and protects the cable wires 40 before the wires enter the motor housing 70 through water-tight ports 78 and 79. This association may be facilitated by standard means such as welding, gluing, mated threads, and equivalent means or may be the result of a fabrication process that produce an entire uniform and continuous structure of the various constituent parts.

Figure 3:
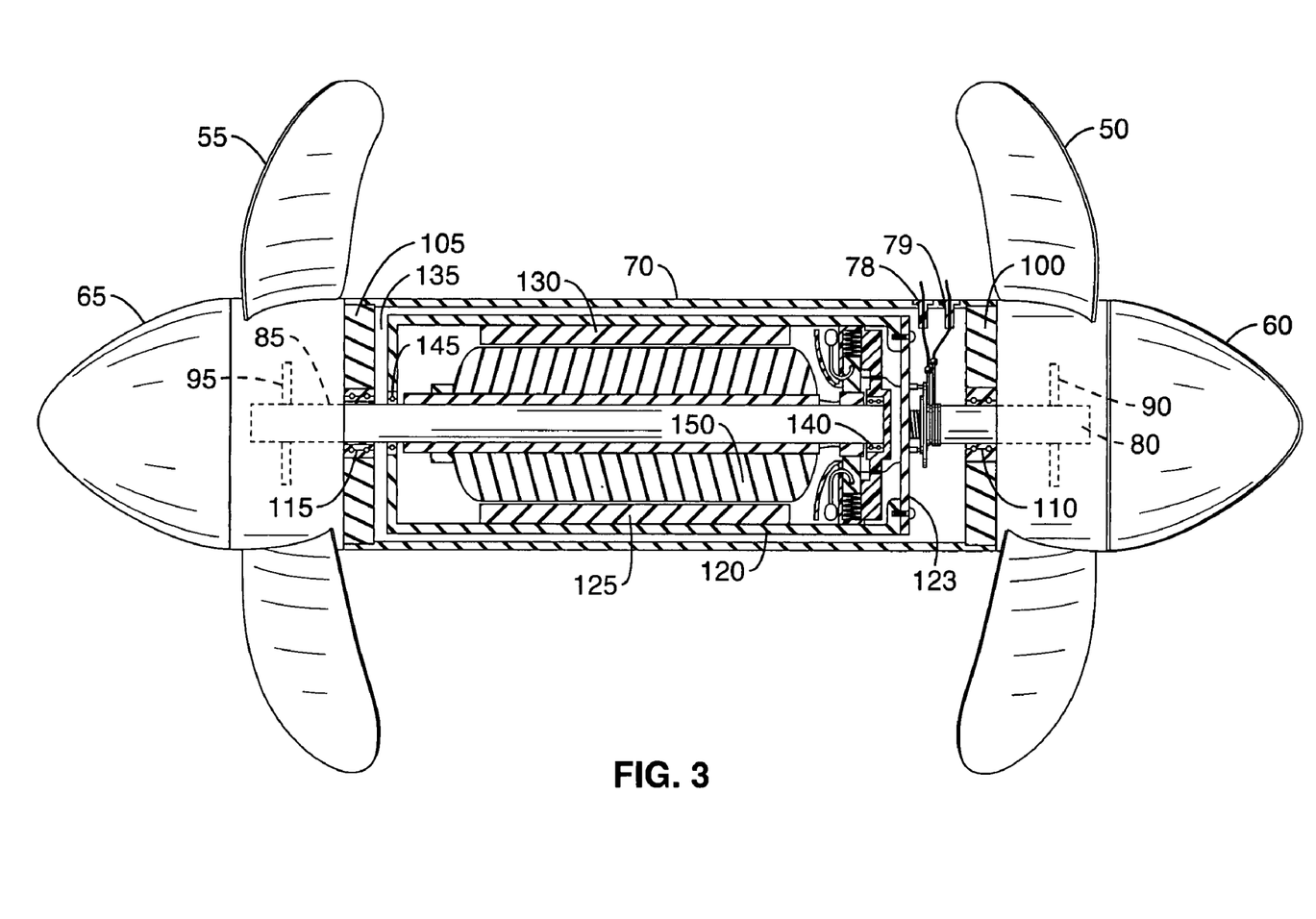
FIG. 3 is a partial cross-sectional view of the counter-rotating motor portion of the subject water-vehicle propulsion system depicting the counter-rotating motor's location between two propellers that rotate in opposite directions during operation of the subject system.

As seen in FIGS. 2 and 3, each propeller 50 and 55 is secured to the end of an axle 80 and 85 by suitable means such as anchoring cross-members 90 and 95 anchored within each propeller 50 and 55, respectively. Other equivalent axle-to-propeller attachment means are considered to be within the realm of this disclosure.

Assisting in forming the water-tight housing assembly 35 are a pair of end plates 100 and 105 that fit in a water-tight fashion within the ends of the motor housing 70. The two plates may be secured in any suitable manner such as bolts, screws, clamps, and the like and may include water-proof gaskets, substances, and the like to prevent the entry of water into the housing 70. Each end plate 100 and 105 has an aperture that surrounds an axle 80 and 85, respectively. Within each aperture is a water-tight bearing assembly 110 and 115 that permits each axle 80 and 85 to rotate freely, yet prevents the entry of water into the motor housing 70.

Within the motor housing 70 is a rotatable stator 120 that has at least two magnets 125 and 130 (permanent magnets in the illustrated embodiment). An air gap 135 separates the outside of the stator 120 from the inside of the motor housing 70. The stator 120 is secured at one end by a detachable axle plate 123 to the stator axle 80. The other end of the stator 120 contains a bearing assembly 145 that rotated on and about the non-stator axle 85 about a central axis.

Within both the motor housing 70 and the rotatable stator 120 is a rotatable armature 150 with traditional wire windings. As described in more detail below, during operation of the subject motor the stator and armature rotate in opposite directions, as shown by the arrows in FIG. 2. The armature 150 is secured to the armature axle 85. One end of the armature axle 85 penetrates the stator bearing assembly 145 and then the water-tight motor housing bearing assembly 115 and terminates in one propeller 55. The other end of the armature axle 85 mates within a bearing cup 140 and is free to rotate therein about the central axis.

Figure 4:
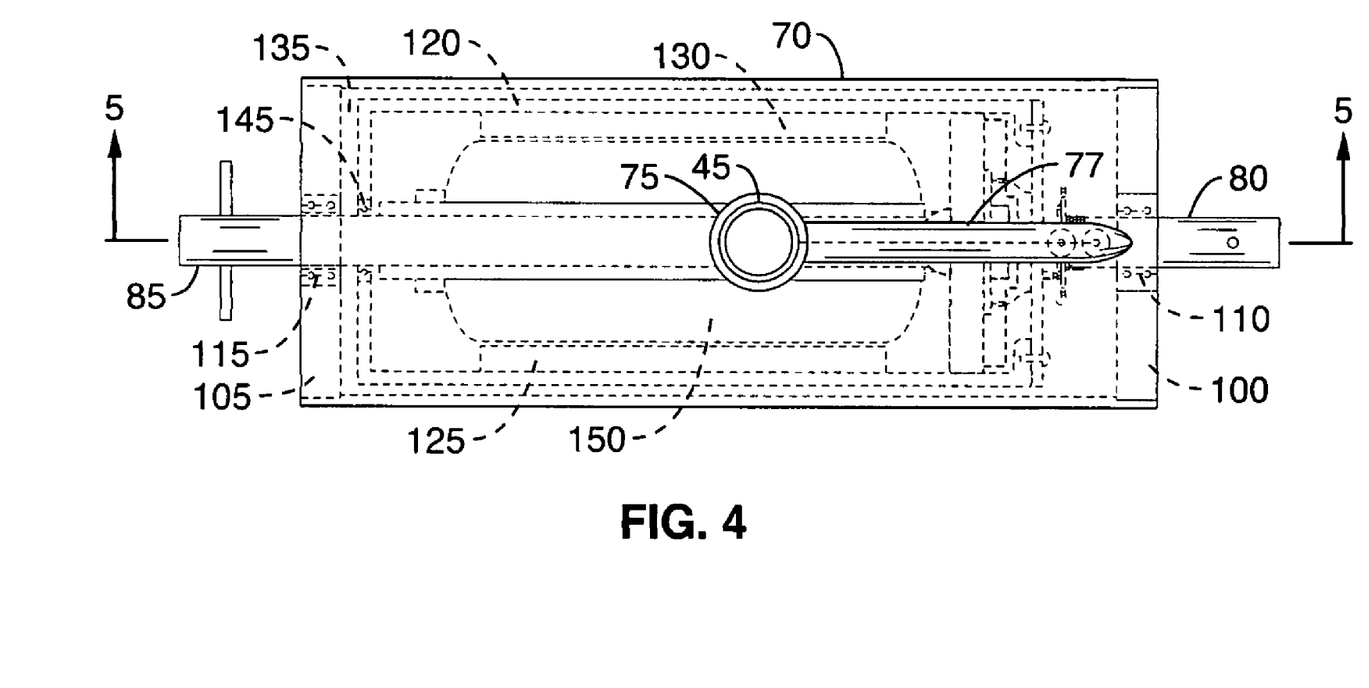
FIG. 4 is a top view of the subject counter-rotating motor depicting internal components.
Figure 5:
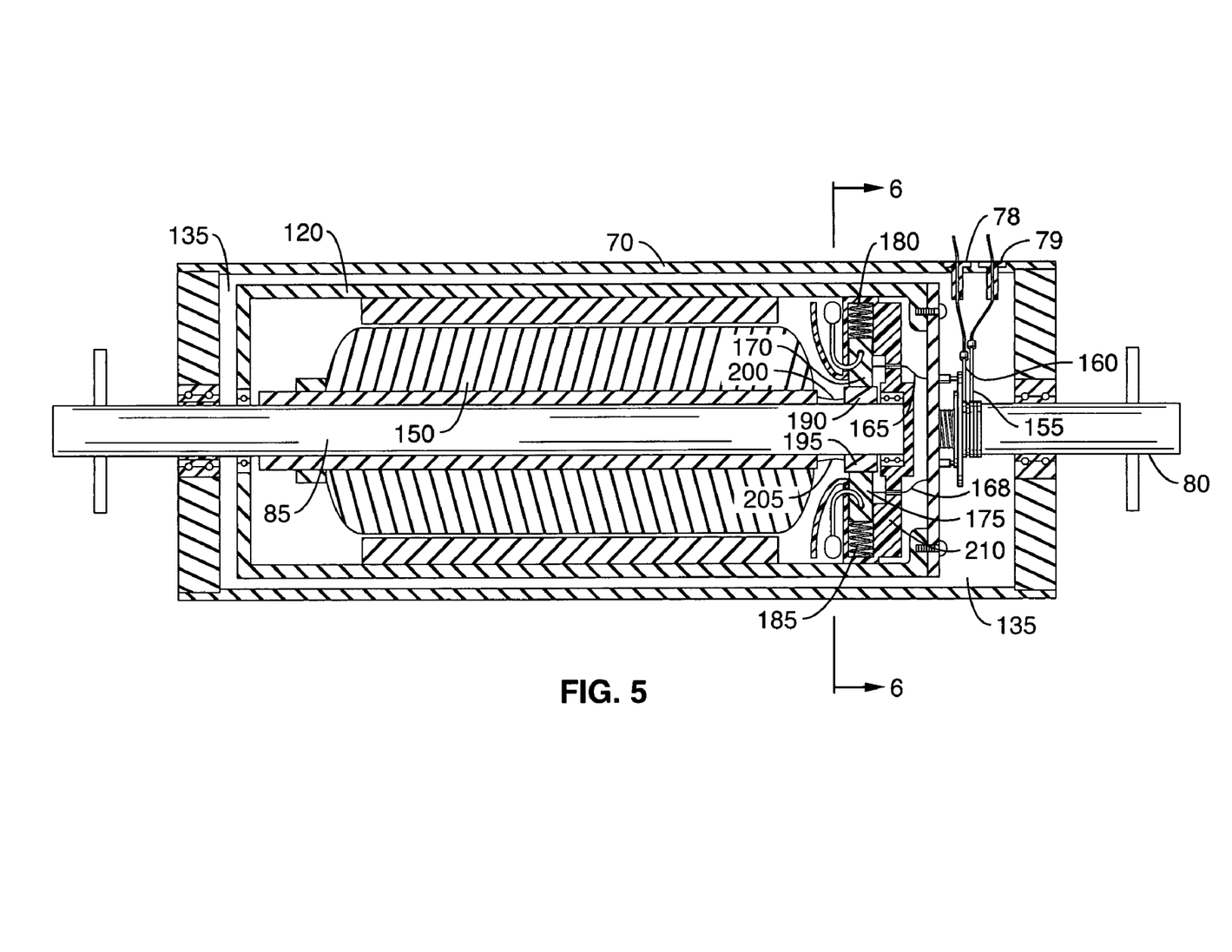
FIG. 5 is a cross-sectional view of the subject counter-rotating motor as seen along the 5-5 indicators shown in FIG. 4.
Figure 8:
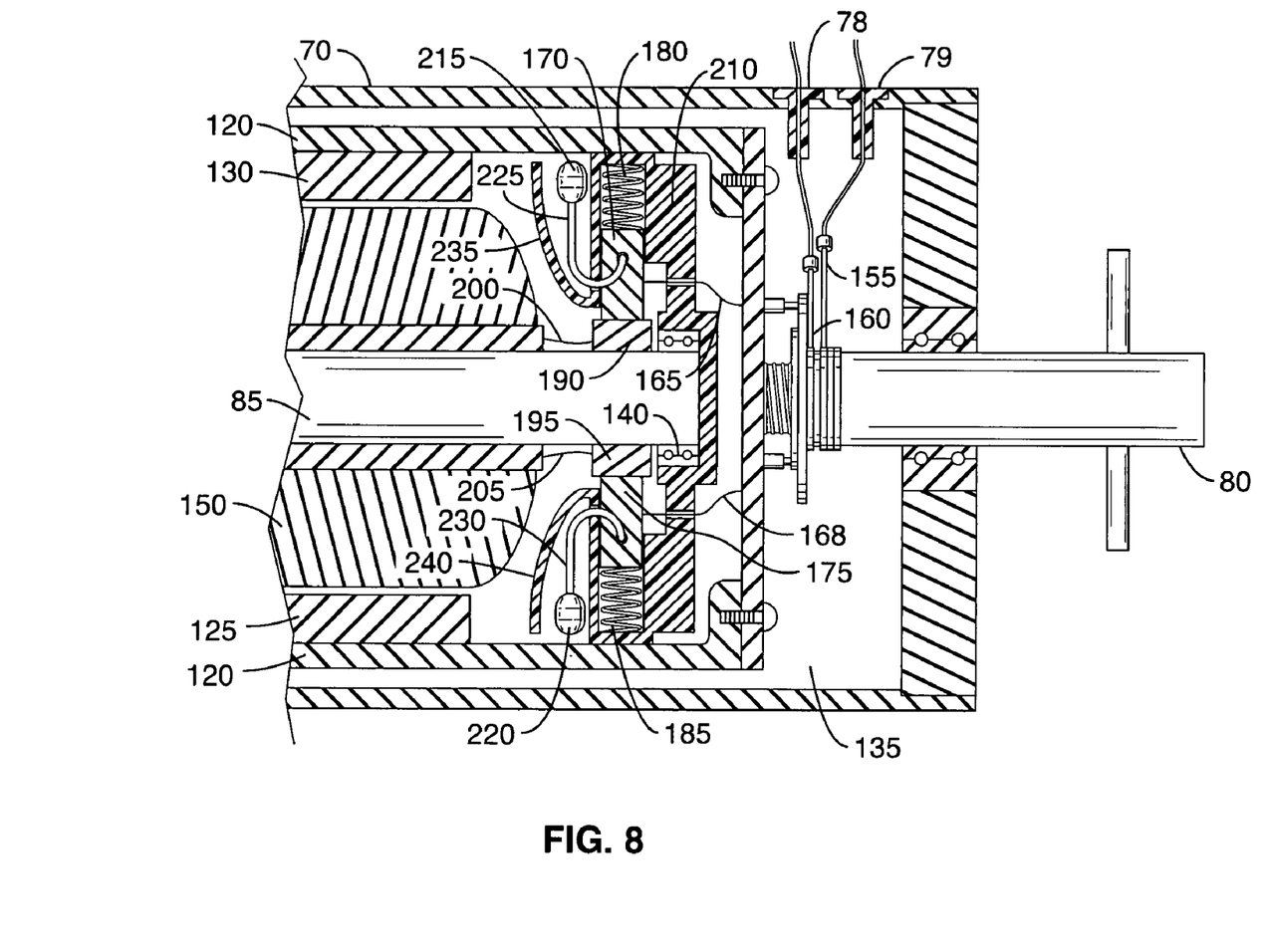
FIG. 8 is a cross-sectional view of the end portion of the subject motor that contains the centrifugal-force-balancing electrical contacting means.

For the sake of clarity, FIGS. 4 through 8 present the counter-rotating motor without the associated propellers 50 and 55 and support shaft 45. First, FIG. 4 is a top view of the subject counter-rotating motor Focusing next on FIGS. 5 and 8 (FIG. 8 is a close-up of an end portion of FIG. 5), during operation of the counter-rotating motor, electric current flow into the motor via cable 40. The two leads from the cable 40 pass through ports 78 and 79 and are attached to two slip-rings 155 and 160 that are mounted to and about the stator axle 80 within the motor housing 70, but outside the stator 120. Lead wires 165 and 168 run from the slip-rings 155 and 160 to brushes 170 and 175. Brush-associated springs 180 and 185 force the brushes 170 and 175, respectively, against the various bars 190 and 195 of a commutator 196. The commutator bars 190 and 195 are connected to the armature windings via wires 200 and 205, respectively. As with a traditional electric motor, as the brushes rotate over the bars on the commutator the different windings on the armature are activated to force rotation of the armature within the surrounding stator and its magnets.

Since both the stator 120 and armature rotate (in opposite directions) during operation of the subject motor, the brushes 170 and 175 begin to lift up and away from contacting the commutator 190 and 195, due to the created outwardly directed centrifugal force (as indicated above, traditional motors utilize a fixed stator with no centrifugal force exerted on the brushes). The resilient force created by the springs 180 and 185 need additional assistance during stator 120 rotation to maintain contact between the brushes 170 and 175 and the commutator 190 and 195. Thus, a centrifugal-force-balancing means must be included in a counter-rotating electric motor. Although other centrifugal-force-balancing means (e.g.: a disk commutator fastened to the armature axle and brushes resiliently directly along the axis-of-rotation to contact the disk commutator and the like) are considered to be within the realm of this disclosure, a preferred embodiment is depicted in FIGS. 2 through 8 in which a counter-weight system is employed.

Figure 6:
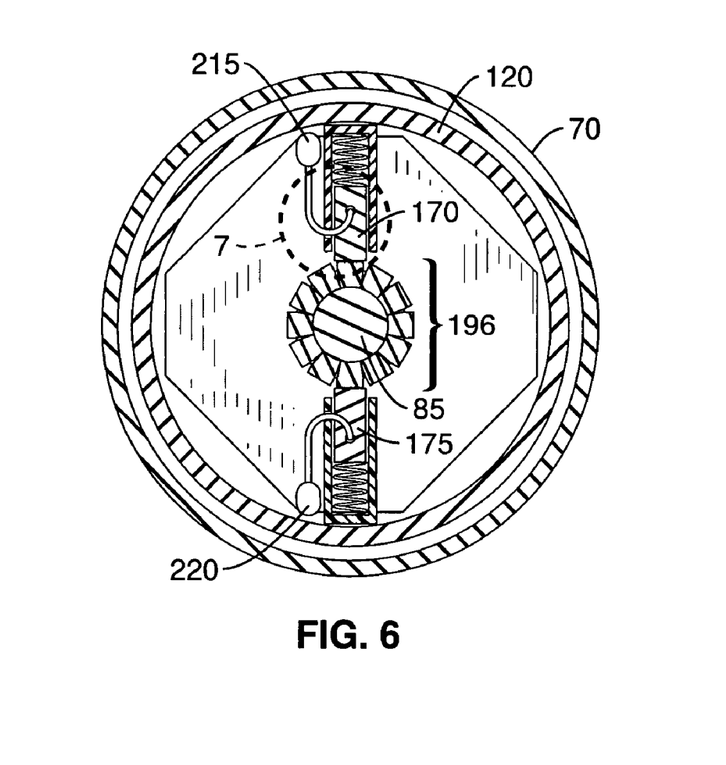
FIG. 6 is a cross-sectional view of the subject motor as seen along the 6-6 indicators shown in FIG. 5.
Figure 7:
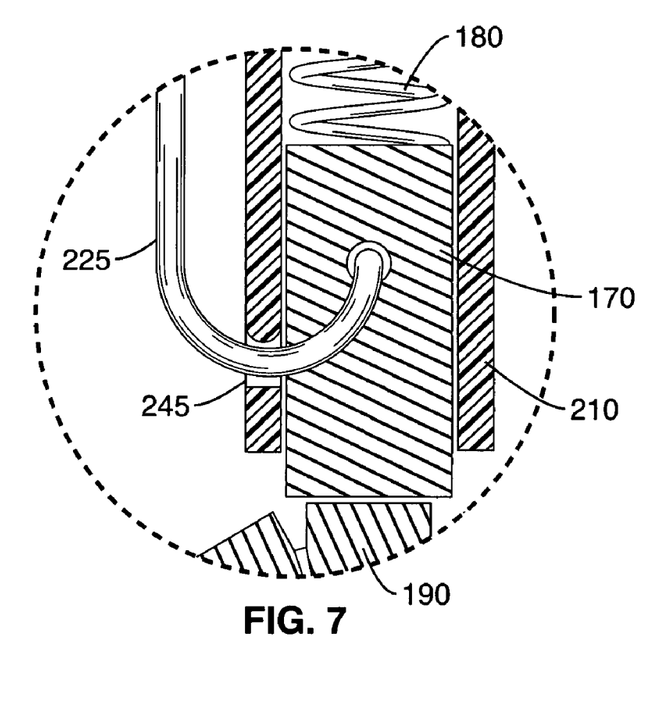
FIG. 7 is the cross-sectional view enlargement indicated on FIG. 6.

Specifically, as seen in the close-up view presented in FIG. 8 and FIGS. 6 and 7, a brush and armature-bearing mounting fixture 210 is secured to the inside surface of the stator 120 and rotates with the stator 120. The mounting fixture 210 holds the already described bearing cup 140 that mates with the end of the armature axle 85, the brushes 170 and 175, and the brush springs 180 and 185. Additionally, counter-weights 215 and 220 are secured to the brushes 170 and 175, respectively, by suitable connection lines 225 and 230. Extending from the main body of the mounting fixture 210 are a pair of protection flanges 235 and 240 that assure the counter-weights do not unintentionally hit the rotating armature 150 as the stator 120 and attached counter-weights 215 and 220 spin in the opposite direction.

FIG. 6 is helpful for examining the elements of the centrifugal-force-balancing means (in this cross-sectional view the protection flanges do not appear). Riding on the commutator 196 are the two brushes 170 and 175 with the associated counter-weights 215 and 220. As can be seen in the enlargement view seen in FIG. 7, the counter-weight line 225 (as does the other non-enlarged line 230) passes through an aperture 245 in the mounting fixture 210. The aperture 245 may also be a slot or equivalent configuration to permit free passage of the line 225. FIG. 7 shows that the aperture 245 is configured to minimize friction on the line 225 by having at least a rounded upper portion over which the line 225 slides during centrifugally-induced movement as the counter-weight 215 moves away from the center of rotation, thereby forcing the brush 170 to maintain contact with the commutator bar 190.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An enhanced electrical motor for use in propelling a water-vehicle, comprising:
   a. a water-secure motor housing;
   b. a stator within said housing having first and second ends that rotates about a central axis in a first direction;
   c. an armature at least partially within said stator having first and second ends that rotates about said central axis in a second direction;
   d. a first axle extending along said central axis and secured to said stator, wherein said axle rotates in said first direction;
   e. a second axle extending along said central axis and secured to said armature, wherein said second axle rotates in said second direction;
   f. centrifugal-force-balancing electrical connection means for providing functioning electrical contacts while operating said motor, wherein said centrifugal-force-balancing electrical connection means includes counter-weight containing electrical contact maintenance means, wherein said counter-weight electrical contact maintenance means comprises:
      i. at least one brush;
      ii. a commutator upon which said brush rides for electrical contact during operation of the electric motor; and
      iii. brush-associated counter-weights for overcoming outwardly directed centrifugal force on each brush, whereby each brush is directed inwardly toward said central axis for maintaining brush-to-commutator contact during operation of the electric motor; and
   g. a first propeller attached to said first axle having associated blades oriented is a first direction; and
   h. a second propeller attached to said second axle having associated blades oriented is a second direction.

2. A propulsion system for use with a water-vehicle, comprising:
   a. a control assembly for speed and direction control the system;
   b. water-vehicle mounting means for mounting the propulsion system to the water-vehicle;
   c. a support shaft connecting said control assembly to said water-vehicle mounting means;
   d. a counter-rotating motor assembly secured to said support shaft, wherein said counter-rotating motor assembly comprises:
      i. a water-secure motor housing;
      ii. a stator within said housing having first and second ends that rotates about a central axis in a first direction;
      iii. an armature at least partially within said stator having first and second ends that rotates about said central axis in a second direction;
      iv. a first axle extending along said central axis and secured to said stator, wherein said axle rotates in said first direction;

v. a second axle extending along said central axis and secured to said armature, wherein said second axle rotates in said second direction; and vi. centrifugal-force-balancing electrical connection means for providing functioning electrical contacts while operating said motor, wherein said centrifugal-force-balancing electrical connection means includes counter-weight containing electrical contact maintenance means, wherein said counter-weight centrifugal-force-overcoming electrical contact maintenance means comprises:

I. at least one brush;

II. a commutator upon which said brush rides for electrical contact during operation of the electric motor; and III. brush-associated counter-weights for overcoming outwardly directed centrifugal force on each brush, whereby each brush is directed centripetally inward toward said central axis for maintaining brush-to-commutator contact during operation of the electric motor; and e. a pair of propellers attached to said counter-rotating motor assembly.

3. A propulsion system for use with a water-vehicle, comprising:

a. a control assembly for speed and direction control of the system;

b. water-vehicle mounting means for mounting the propulsion system to the water-vehicle;

c. a motor housing support shaft affixed to said control assembly and extending from said water-vehicle mounting means to a water-secure motor housing;

d. said water-secure motor housing;

e. a stator within said housing having first and second ends that rotates about a central axis in a first direction;

f. an armature at least partially within said stator having first and second ends that rotates about said central axis in a second direction;

g. a first axle extending along said central axis and secured to said stator, wherein said axle rotates in said first direction;

h. a second axle extending along said central axis and secured to said armature, wherein said second axle rotates in said second direction;

i. centrifugal-force-balancing electrical connection means for providing functioning electrical contacts while operating said motor, wherein said centrifugal-force-balancing electrical connection means includes counter-weight containing electrical contact maintenance means, wherein said counter-weight containing electrical contact maintenance means comprises:

i. at least one brush;

ii. a commutator upon which said brush rides for electrical contact during operation of the electric motor; and iii. brush-associated counter-weights for overcoming outwardly directed centrifugal force on each brush, whereby each brush is directed inwardly toward said central axis for maintaining brush-to-commutator contact during operation of the electric motor; and j. a first propeller attached to said first axle having associated blades oriented is a first direction; and k. a second propeller attached to said second axle having associated blades oriented is a second direction.

* * * * *